(12) United States Patent
Weller et al.

(10) Patent No.: US 10,950,208 B2
(45) Date of Patent: Mar. 16, 2021

(54) REAR VISION PROJECTED DISPLAY FOR A VEHICLE

(71) Applicant: Gentex Corporation, Zeeland, MI (US)

(72) Inventors: Andrew D. Weller, Holland, MI (US); Eric S. Lundy, Grand Rapids, MI (US); Richard T. Fish, Jr., Hudsonville, MI (US); Luke A. Bomers, Grandville, MI (US); Jason D. Hallack, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 16/514,212

(22) Filed: Jul. 17, 2019

(65) Prior Publication Data
US 2020/0027428 A1 Jan. 23, 2020

Related U.S. Application Data

(60) Provisional application No. 62/699,039, filed on Jul. 17, 2018.

(51) Int. Cl.
*G09G 5/38* (2006.01)
*B60R 1/00* (2006.01)
(Continued)

(52) U.S. Cl.
CPC ............... *G09G 5/38* (2013.01); *G02B 5/32* (2013.01); *G02B 30/56* (2020.01); *G03H 1/26* (2013.01);
(Continued)

(58) Field of Classification Search
CPC ....... B60R 1/02–08; B60R 1/088; B60R 1/00; B60R 2300/205; B60R 2300/8066;
(Continued)

(56) References Cited

U.S. PATENT DOCUMENTS 6,757,085 B1 * 6/2004 Halldorsson .............. B60R 1/00
359/13
10,185,212 B1 * 1/2019 Chung ............... H04N 21/4728
(Continued)

FOREIGN PATENT DOCUMENTS

RU 157419 U1 12/2015
RU 2588282 C2 6/2016
WO 2016173763 A1 11/2016

*Primary Examiner* — Xuemei Zheng
(74) *Attorney, Agent, or Firm* — Price Heneveld LLP; Bradley D. Johnson

(57) ABSTRACT

The disclosure provides for a display apparatus for a vehicle for displaying images captured by at least one image sensor to a driver of the vehicle. The display apparatus includes a display projector configured to project images derived from the image data, a display screen for displaying images projected thereon by the display projector, and a reflector positioned to reflect the images from the display screen towards a viewing direction. According to one embodiment, the display apparatus further includes an adjustment mechanism for adjusting the display projector relative to the vehicle. According to another embodiment, the display apparatus further includes a frame assembly on which the display projector, the display screen, and the reflector are mounted, the frame assembly is mounted to the vehicle such that the frame assembly may be moved relative to the vehicle to adjust the positions of the display projector, the display screen, and the reflector.

18 Claims, 3 Drawing Sheets

(51) Int. Cl.
*G06F 3/01* (2006.01)
*G09G 5/10* (2006.01)
*G02B 5/32* (2006.01)
*G03H 1/26* (2006.01)
*G02B 30/56* (2020.01)

(52) U.S. Cl.
CPC .............. *G06F 3/012* (2013.01); *G06F 3/013* (2013.01); *G09G 5/10* (2013.01); *B60R 1/00* (2013.01); *B60R 2300/205* (2013.01); *B60R 2300/8066* (2013.01); *G03H 2001/2615* (2013.01)

(58) Field of Classification Search
CPC ...... G02B 27/0101; G02B 30/56; G02B 5/32; G02B 27/0093; G09G 5/38; G06F 3/012–013
See application file for complete search history.

(56) References Cited

U.S. PATENT DOCUMENTS

| | | | |
|---|---|---|---|
| 2016/0209647 A1* | 7/2016 | Fursich | G02B 27/0093 |
| 2019/0126824 A1* | 5/2019 | Oba | G02B 27/0101 |

* cited by examiner

REAR VISION PROJECTED DISPLAY FOR A VEHICLE

CROSS-REFERENCE TO RELATED APPLICATION

This application claims priority to and the benefit under 35 U.S.C. § 119(e) of U.S. Provisional Patent Application No. 62/699,039, filed on Jul. 17, 2018, entitled "REAR VISION PROJECTED DISPLAY FOR A VEHICLE," by Andrew D. Weller et al., the entire disclosure of which is incorporated herein by reference.

TECHNOLOGICAL FIELD

The present invention generally relates to display devices for vehicles and more particularly to display devices configured to generate image data for ease of viewing a vehicular display.

SUMMARY OF THE DISCLOSURE

According to one aspect of the present disclosure, a display apparatus for a vehicle is provided for displaying images captured by at least one image sensor to a driver of the vehicle. The display apparatus comprises a display configured to display images, wherein the images are derived from the image data; a reflector positioned to reflect the images from the display towards a viewing direction; and an adjustment mechanism for adjusting the position of the display relative to the vehicle in response to an adjustment signal.

According to another aspect of the present disclosure, a display apparatus for a vehicle is provided for displaying images captured by at least one image sensor to a driver of the vehicle. The display apparatus comprises a display projector configured to project images, wherein the images are derived from the image data; a display screen for displaying images projected thereon by the display projector; a reflector positioned to reflect the images from the display screen towards a viewing direction; and a frame assembly on which the display projector, the display screen, and the reflector are mounted, the frame assembly being configured for mounting to the vehicle such that the frame assembly may move relative to the vehicle and thereby adjust the positions of the display projector, the display screen, and the reflector.

According to another aspect of the present disclosure, a display apparatus for a vehicle is provided for displaying images captured by at least one image sensor to a driver of the vehicle. The display apparatus comprises a display projector configured to project images, wherein the images are derived from the image data; a display screen for displaying images projected thereon by the display projector; a reflector positioned to reflect the images from the display screen towards a viewing direction; an adjustment mechanism for adjusting the position of the display projector relative to the vehicle in response to an adjustment signal; and a controller for generating the adjustment signal in response to an indication of a head position of the driver.

These and other features, advantages, and objects of the present invention will be further understood and appreciated by those skilled in the art by reference to the following specification, claims, and appended drawings.

DETAILED DESCRIPTION

Figure 1:
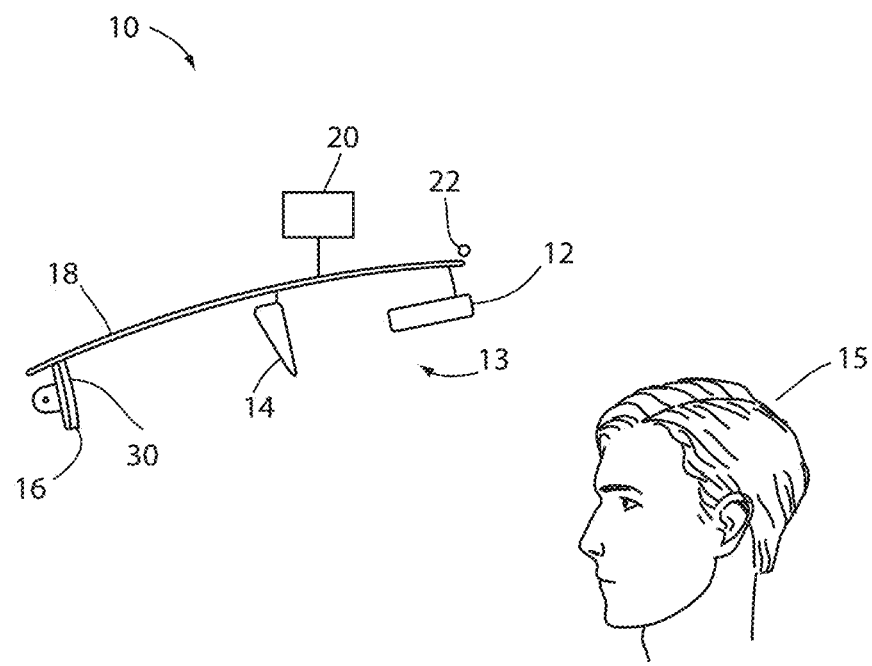
FIG. 1 is a side elevational view of a display apparatus according to a first embodiment.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the element closer to an intended viewer of a display, and the term "rear" shall refer to the surface of the element further from the intended viewer of the display. However, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-5, the disclosure provides for a display apparatus 10 for a vehicle. The display apparatus 10 may be operable to display images captured by at least one image sensor 52 (FIG. 5) to a driver 15 of the vehicle. The image sensor 52 may be mounted on the vehicle so as to capture a rearward scene. The display apparatus 10 may include a display 13 configured to display images, wherein the images are derived from the image data. A reflector 16 is positioned to reflect the images from the display 13 towards a viewing direction.

The display 13 may be an LCD, OLED, MicroLED, etc. with narrow red, green and blue backlight bandwidth. The display 13 may alternatively comprise a display projector 12 configured to project images, and a display screen 14 is provided for displaying images projected thereon by the display projector 12.

One problem with display systems of the type that employ a display projector 12, a display screen 14, and a reflector 16 is that the viewing window in which the driver 15 may be able to view the reflected image, is fairly narrow such that the system may not be practical for drivers of various heights. Accordingly, the display system 10 is configured to solve this problem by making the system positionally adjustable to accommodate drivers of differing heights.

To provide for this adjustability, an adjustment mechanism is provided for adjusting the position of at least the display projector 12 relative to the vehicle in response to an adjustment signal. The adjustment of at least the display projector 12 may be either: (1) the display projector 12, the display screen 14, and the reflector 16 may be moved together as a unit, or (2) the display projector 12 alone may be moved. Accordingly, there are two embodiments described below where each embodiment uses a different one of the two approaches.

Figure 2:
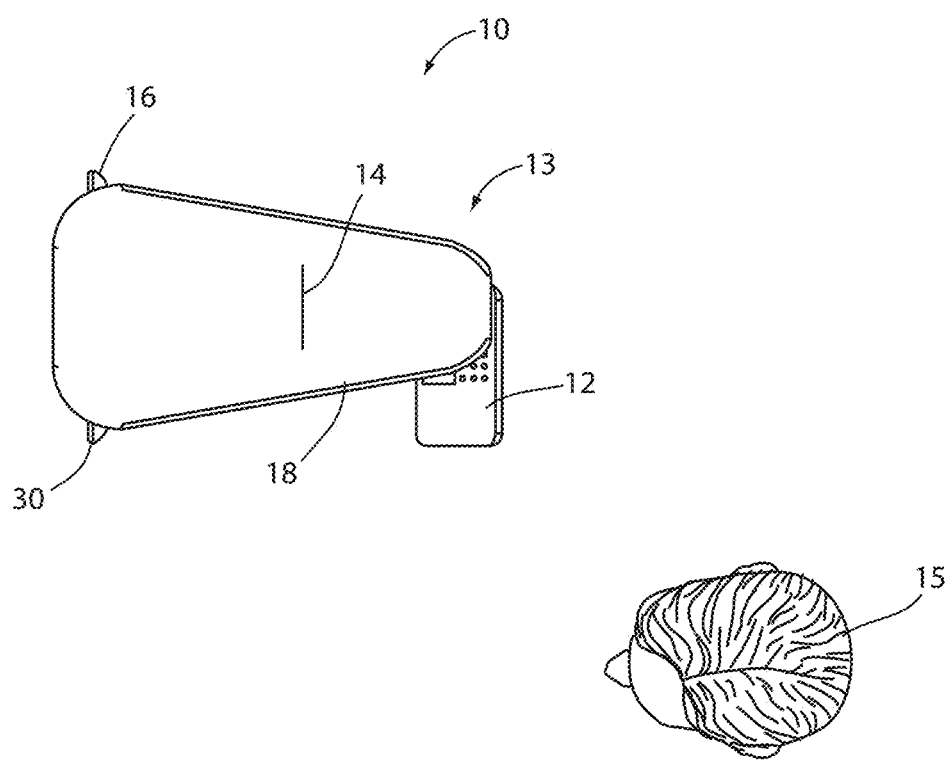
FIG. 2 is a top view of the display apparatus of FIG. 1.

The first embodiment is shown in FIGS. 1 and 2 in which a frame assembly 18 is provided on which the display projector 12, the display screen 14, and the reflector 16 are mounted. The frame assembly 18 being configured for mounting to the vehicle such that the frame assembly 18 may move relative to the vehicle and thereby adjust the positions of the display projector 12, the display screen 14, and the reflector 16 together while maintaining the position of these components relative to one another.

The display apparatus 10 may further include a frame adjustment actuator 20 for adjusting the position of the frame assembly 18 relative to the vehicle in response to an adjustment signal. A controller 50 (FIG. 5) may be coupled to the frame adjustment actuator 20. The controller 50 is configured to generate the adjustment signal in response to an indication of a head position of the driver 15 as described further below.

Figure 3:
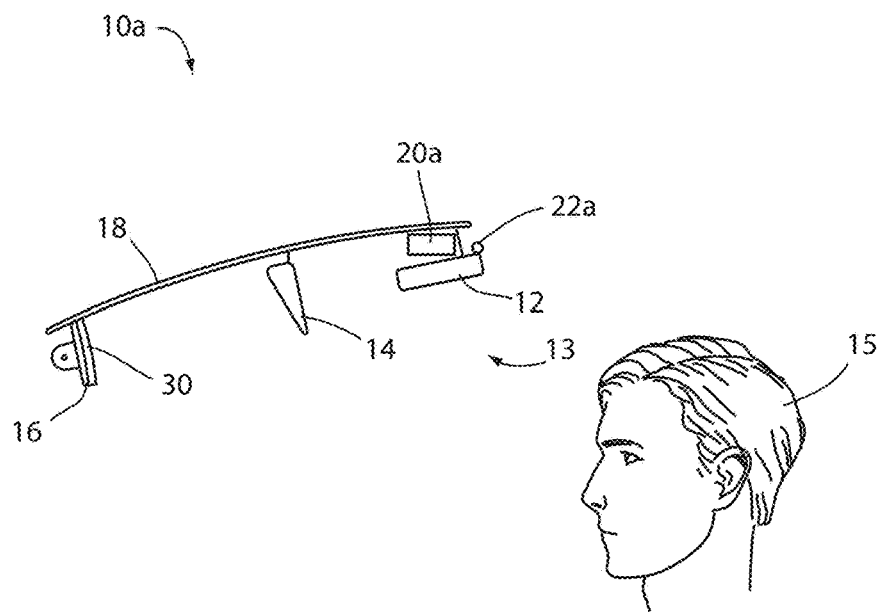
FIG. 3 is a side elevational view of a display apparatus according to a second embodiment.

The second embodiment is shown in FIG. 3 in which the display apparatus 10*a* differs in that actuator 20*a* is configured to adjust only the position of the display projector 12 such that the position of display projector 12 may be independently adjusted relative to the display screen 14 and the reflector 16.

In both the display apparatus 10 and the display apparatus 10*a*, the reflector 16 may include a stack of holograms where each hologram is configured to act as a convex mirror with respect to a particular narrow waveband of light. The holograms may thus each reflect different wavelengths of light. For example, a first hologram may reflect a narrow band of red light, a second hologram may reflect a narrow band of green light, and a third hologram may reflect a narrow band of blue light. The display projector 12 may be configured to project red, green, and blue light in these narrow bandwidths so that the light from the projector 12, as shown on display screen 14, may be reflected by the holograms of reflector 16. In this example, the three holograms together may reflect full color images from the projector 12, and yet the reflector 16 will appear transparent with respect to light outside the bandwidths of the holograms. This creates an appearance of an image that floats in space as the driver moves his/her head within the viewing window. The color images to be projected from projector 12 can be shifted in position using software to obtain alignment of different color images in case of any alignment offset caused by the holograms.

The reflector 16 may be positioned in a rearview mirror assembly 30 that may be operated in either a mirror mode or a display mode. The mirror mode allows the rearview mirror assembly 30 to act as a conventional rearview mirror and thus allow for changes in position when used in the mirror mode similar to a conventional rearview mirror assembly. However, when in the display mode, the rearview mirror assembly 30 would lock in a position orthogonal to the projection axis as shown in FIG. 2. The rearview mirror assembly could include a motor for moving the mirror element or the housing of the rearview mirror assembly 30 to the orthogonal position under control of the controller 50 when a display mode is selected.

Figure 4:
FIG. 4 is a top view of a display apparatus according to a third embodiment.
Figure 4:
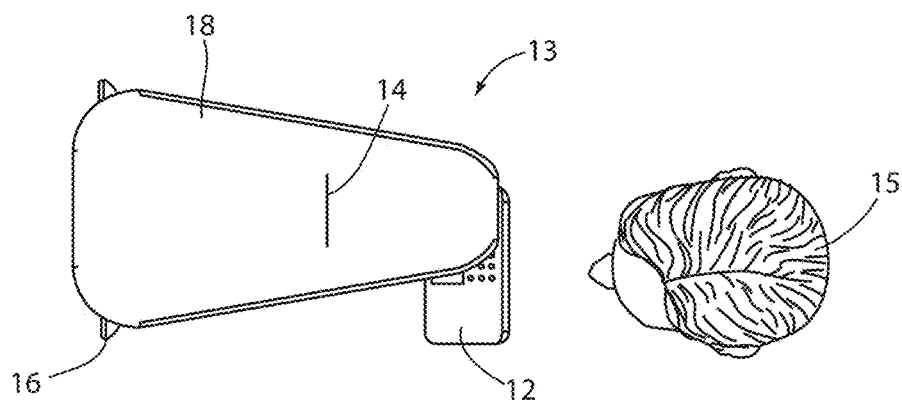
Figure 5:
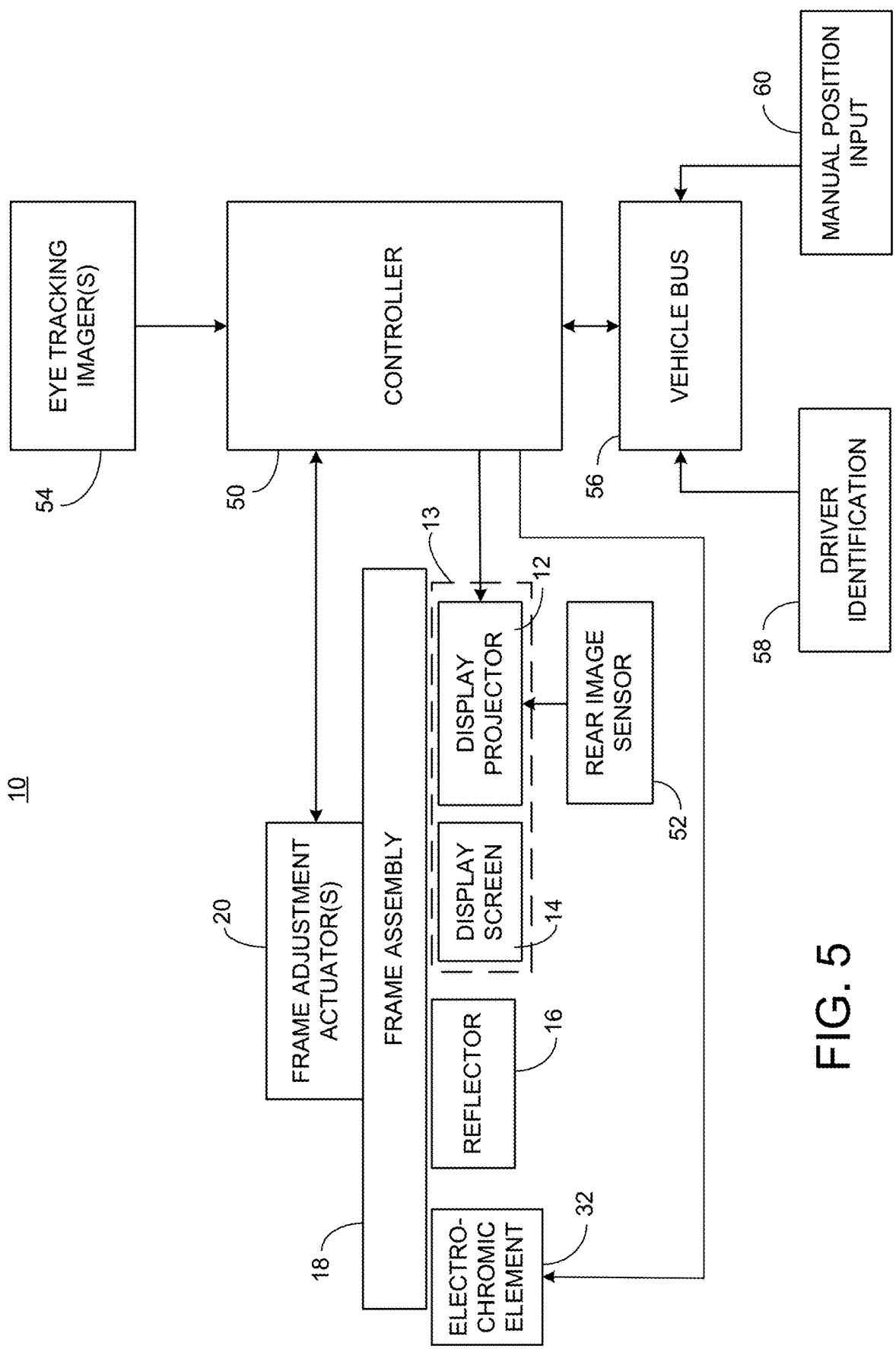
FIG. 5 is an electrical circuit diagram in block form of the display apparatus of FIGS. 1-4.

Alternatively, as shown in FIG. 4, a third embodiment has the reflector 16 separate from the rearview mirror assembly 30 whereby the display apparatus may be positioned closer to a position directly overhead of the driver 15.

The display apparatus 10 may further include an electrochromic element 32 (FIG. 5) positioned behind the reflector 16 that may be selectively dimmed during daytime conditions so as to decrease the light from the forward scene that may compete with the light reflected from the reflector 16 and to enhance contrast. The electrochromic element 32 may be mounted to the reflector 16 within or outside of a rearview mirror assembly 30 or may be provided separate from the reflector 16 such as on the vehicle windscreen or in a visor that is either permanently in a down position or which may be flipped down. The reflector 16 may also be mounted to the vehicle windscreen or in a visor. In the case of providing the reflector 16 and the electrochromic element 32 on the windscreen, the electrochromic element 32 and the hologram stack of the reflector 16 may be laminated to the windscreen and skew/keystone can be compensated by image processing of the image projected from the projector 12. The dimmed state of the electrochromic element 32 may be controlled by the controller 50, which may dim the electrochromic element 32 when in a display mode while otherwise allowing the electrochromic element 32 to be dimmed or cleared in a manner that is conventional for electrochromic rearview mirrors when in the mirror mode. The electrochromic element 32 and the reflector 16 could be located in a conventional heads-up display position as well. As an alternative to the electrochromic element 32, a tint layer may be provided; however, the tint layer could not be made fully transmissive when not in use as would the electrochromic element 32.

The display screen 14 includes a diffuser that may have a diffusion pattern to spread light out plus or minus 25 degrees horizontally and plus or minus 25 degrees vertically when the projector 12 projects collimated light. The diffuser may be any conventional diffuser such as those used in a backlight assembly of a rear display.

The actuator(s) 20 may include one actuator or a plurality of actuators for moving the frame/projector in different axes. For example, there may be a first actuator for horizontal movement and a second actuator for altitudinal movement. The actuator(s) 20 may take any known form such as a positional solenoid or stepper motor with rack and pinions for each movement requirement. The frame/projector may be moved with linear travel and position guide for angle/vertical adjustment similar to a sunroof track. The one or more of the projector 12, display screen 14, or reflector 16 may be mounted using articulated friction joints. As shown in FIG. 1, the actuator(s) 20 may cause the frame assembly 18 to pivot about a pivot point 22. Similarly, as shown in FIG. 3, the actuator(s) 20*a* may cause the display projector 12 to pivot about a pivot point 22*a*.

As mentioned above, the controller 50 may control the actuator(s) 20, 20*a* to adjust the position of either the frame assembly 18 or the projector 12. The controller 50 may automatically adjust the position based on input from eye-tracking imager(s) 54 (FIG. 5) that detect and track the position of the driver's eyes. Such imager(s) 54 may also serve the purpose of detecting patterns in the irises of the driver's eyes for biometric identification of the driver. An example of such eye-tracking imagers is disclosed in commonly-assigned U.S. Patent Application Publication Nos. US 2017/0177935 A1 and US 2019/0381938 A1, the entire disclosures of which are incorporated herein by reference.

The controller 50 may also or alternatively be coupled to a vehicle bus 56, which in turn is coupled to a control module 58 that performs driver identification. Such a driver identification module may identify the driver by: (1) receipt of a wireless door unlock signal from a key fob associated with a particular driver; (2) input from a driver number switch that may be pressed by the driver; and/or (3) biometric identification. In addition (or as an alternative), input from a manual position input 60 may be used to adjust the position of the frame 18 and/or projector 12. Such a manual position input 60 may be similar to the manual adjustment input for outside rearview mirrors, for example. Once the frame 18 and/or projector 12 is manually positioned in the desired location for a particular driver, the position may be stored in memory and then recalled whenever the driver identification module identifies the particular driver.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A display apparatus for a vehicle for displaying images captured by at least one image sensor to a driver of the vehicle, the display apparatus comprising:
   a display configured to display images;
   a reflector positioned to reflect the images from the display towards a viewing direction;
   an adjustment mechanism for adjusting the position of the display relative to the vehicle in response to an adjustment signal; and
   a frame assembly on which the display and the reflector are mounted, wherein the adjustment mechanism is a frame adjustment actuator and wherein the frame assembly is configured for mounting to the vehicle such that the frame adjustment actuator may move the frame assembly relative to the vehicle and thereby adjust the positions of the display and the reflector.

2. The display apparatus of claim 1, wherein the display comprises:
   a display projector configured to project images; and
   a display screen for displaying images projected thereon by the display projector,
   wherein the adjustment mechanism adjusts the position of the display by adjusting the position of the display projector.

3. The display apparatus of claim 1, and further comprising:
   a controller for generating the adjustment signal in response to an indication of a head position of the driver.

4. The display apparatus of claim 3, and further comprising an eye-tracking imager for tracking the position of the driver's eyes, whereby the controller receives the position of the driver's eyes to determine the head position of the driver.

5. The display apparatus of claim 1, and further comprising:
   a controller coupled to the frame adjustment actuator, the controller configured to generate the adjustment signal in response to an indication of a head position of the driver.

6. The display apparatus of claim 1, wherein the display uses three different narrow wavebands of light to form the displayed images.

7. The display apparatus of claim 6, wherein the reflector comprises a stack of holograms where each hologram is configured to act as a convex mirror with respect to one of the three different narrow wavebands of light.

8. The display apparatus of claim 1, and further comprising:
   an electrochromic element positioned behind the reflector for dimming when images are displayed to decrease light from a forward scene.

9. A display apparatus for a vehicle for displaying images captured by at least one image sensor to a driver of the vehicle, the display apparatus comprising:
   a display projector configured to project images;
   a display screen for displaying images projected thereon by the display projector;
   a reflector positioned to reflect the images from the display screen towards a viewing direction; and
   a frame assembly on which the display projector, the display screen, and the reflector are mounted, the frame assembly being configured for mounting to the vehicle such that the frame assembly may move relative to the vehicle and thereby adjust the positions of the display projector, the display screen, and the reflector.

10. The display apparatus of claim 9, and further comprising:
a frame adjustment actuator for adjusting the position of the frame assembly relative to the vehicle in response to an adjustment signal; and
a controller coupled to the frame adjustment actuator, the controller configured to generate the adjustment signal in response to an indication of a head position of the driver.

11. The display apparatus of claim 9, wherein the display screen comprises a diffuser.

12. The display apparatus of claim 9, and further comprising an electrochromic element positioned behind the reflector for dimming when images are displayed to decrease light from a forward scene.

13. The display apparatus of claim 9, and further comprising an eye-tracking imager for tracking the position of the driver's eyes, whereby the controller receives the position of the driver's eyes to determine the head position of the driver.

14. The display apparatus of claim 9, wherein the display projector projects three different narrow wavebands of light to form the projected images.

15. The display apparatus of claim 14, wherein the reflector comprises a stack of holograms where each hologram is configured to act as a convex mirror with respect to one of the three different narrow wavebands of light.

16. A display apparatus for a vehicle for displaying images captured by at least one image sensor to a driver of the vehicle, the display apparatus comprising:

a display projector configured to project images;
a display screen for displaying images projected thereon by the display projector;
a reflector positioned to reflect the images from the display screen towards a viewing direction;
an adjustment mechanism for adjusting the position of the display projector relative to the vehicle in response to an adjustment signal;
a controller for generating the adjustment signal in response to an indication of a head position of the driver; and
a frame assembly on which the display projector, the display screen, and the reflector are mounted, wherein the adjustment mechanism is a frame adjustment actuator and wherein the frame assembly is configured for mounting to the vehicle such that the frame adjustment actuator may move the frame assembly relative to the vehicle and thereby adjusts the positions of the display projector, the display screen, and the reflector.

17. The display apparatus of claim 16, and further comprising an eye-tracking imager for tracking the position of the driver's eyes, whereby the controller receives the position of the driver's eyes to determine the head position of the driver.

18. The display apparatus of claim 16, wherein the display projector projects three different narrow wavebands of light to form the projected images, and wherein the reflector comprises a stack of holograms where each hologram is configured to act as a convex mirror with respect to one of the three different narrow wavebands of light.

* * * * *